(12) United States Patent
Hudgens

(10) Patent No.: US 8,226,735 B2
(45) Date of Patent: Jul. 24, 2012

(54) SUBTERRANEAN WELL PRODUCTION SALTWATER EVAPORATION STATION

(76) Inventor: Dennis Hudgens, Saginaw, TX (US)

( * ) Notice: Subject to any disclaimer, the term of this patent is extended or adjusted under 35 U.S.C. 154(b) by 504 days.

(21) Appl. No.: 12/476,438

(22) Filed: Jun. 2, 2009

(65) Prior Publication Data

US 2010/0303709 A1 Dec. 2, 2010

(51) Int. Cl.
*C01D 1/30* (2006.01)
(52) U.S. Cl. ........................ 23/303; 423/206.1
(58) Field of Classification Search .................. 23/303, 23/296, 295 R; 423/179, 206.1
See application file for complete search history.

(56) References Cited

U.S. PATENT DOCUMENTS 3,779,030 A * 12/1973 Best ............................. 62/541
6,340,373 B1 * 1/2002 Billington .................. 23/295 R

* cited by examiner

*Primary Examiner* — Edward Johnson
(74) *Attorney, Agent, or Firm* — Conley Rose, P.C.; Grant Rodolph

(57) ABSTRACT

A process comprising receiving production saltwater comprising water, salt, and hydrocarbons, separating substantially all of the hydrocarbons from the production saltwater, evaporating at least some of the water in the production saltwater to obtain the salt, and collecting the salt. Also disclosed is a facility comprising a settling pit, an evaporator in fluid communication with the settling pit and comprising a nozzle configured to emit a stream along a path, and a collection pit positioned under the path.

20 Claims, 7 Drawing Sheets

SUBTERRANEAN WELL PRODUCTION SALTWATER EVAPORATION STATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Water occurs naturally in subterranean formations, and as such may be produced in conjunction with hydrocarbons from oil and gas wells. Water also may be used to stimulate hydrocarbon production in oil and gas wells. When the water is produced from oil or gas wells, it typically comprises sufficient amounts of dissolved salts to make it unsuitable for agriculture and other purposes. The produced saltwater may also comprise several harmful compounds, such as benzene, toluene, ethylbenzene, xylene, transition metals, or combinations thereof. As such, oil and gas well operators generally have to pay to dispose of any produced saltwater.

SUMMARY

In one embodiment, the disclosure includes a process comprising receiving production saltwater comprising water, salt, and hydrocarbons, separating substantially all of the hydrocarbons from the production saltwater, evaporating at least some of the water in the production saltwater to obtain the salt, and collecting the salt.

In another embodiment, the disclosure includes a facility comprising a settling pit, an evaporator in fluid communication with the settling pit and comprising a nozzle configured to emit a stream along a path, and a collection pit positioned under the path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and apparatus for recovering salt from saltwater produced from subterranean wells, such as oil and gas wells. The production saltwater may be received in a reception area and subsequently stored in a storage area. The production saltwater may undergo an initial separation in the storage area to remove some of the hydrocarbons from the saltwater. The saltwater may then be passed to a separation area comprising one or more settling pits. In the settling pits, solids may settle out of the saltwater and any residual hydrocarbons may be removed from the saltwater. The saltwater may then be sent to an evaporation area where the saltwater is sprayed into the air. While in the air, substantially all of the water in the saltwater may evaporate and the salt may fall into a collection pit. The salt may be periodically moved from the collection pit to a storage area, where the salt may be kept until it is loaded into a storage container or vehicle.

Figure 1:
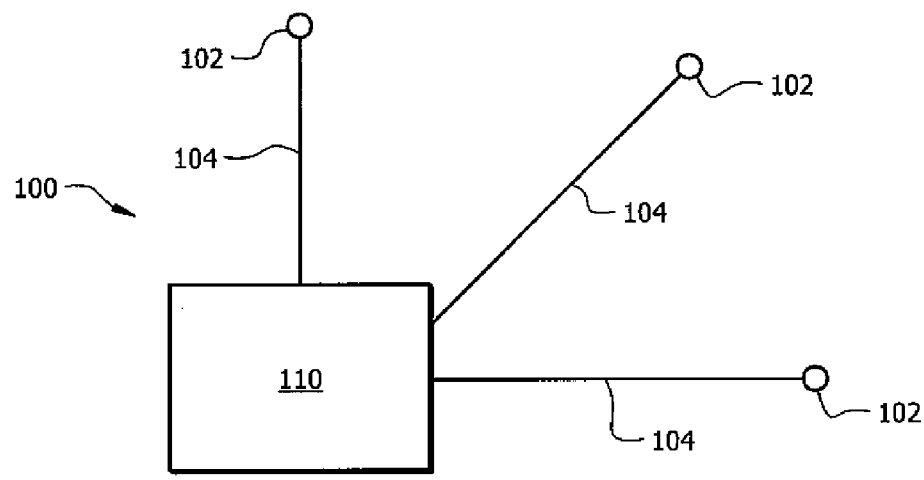
FIG. 1 is a schematic view of an embodiment of a subterranean well production field.

FIG. 1 depicts an embodiment of a subterranean well field 100. The subterranean well field 100 may comprise a plurality of wells 102 coupled to a salt production station 110 via a plurality of pipelines 104. The wells 102 may be hydrocarbon, e.g. oil and/or natural gas, wells that produce production saltwater as a byproduct. For example, each well 102 may produce at least about 1 barrel per day, from about 5 to about 50 barrels per day, or about 25 barrels per day of production saltwater. The production saltwater may comprise water and one or more salts, perhaps in combination with other compounds. The saltwater present in the effluent from the wells 102 may be the result of subterranean water deposits that are in fluid communication with the subterranean hydrocarbon deposits. Alternatively, the saltwater present in the effluent from the wells 102 may be the result of water and/or steam injection into the subterranean formation, for example to increase hydrocarbon production from the well 102. The wells 102 may comprise a separation system that separates the well effluent into a hydrocarbon-rich stream and a production saltwater-rich stream, which may be sent to the salt production station 110. In other embodiments, the wells 102 may be water wells or any other apparatus that produces saltwater.

The wells 102 may transport the production saltwater to the salt production station 110 via the pipelines 104. The pipelines 104 are similar to those well-known in the art and may comprise metal or composite piping having a diameter appropriate for the production saltwater flow. The length of the pipeline 104 may vary depending on the distance between the wells 102 and the salt production station 110. For example, the pipelines 104 may be as short as a few yards or as long as several hundred miles. Typically, the pipelines 104 may have a length less than about 100 miles.

Figure 2:
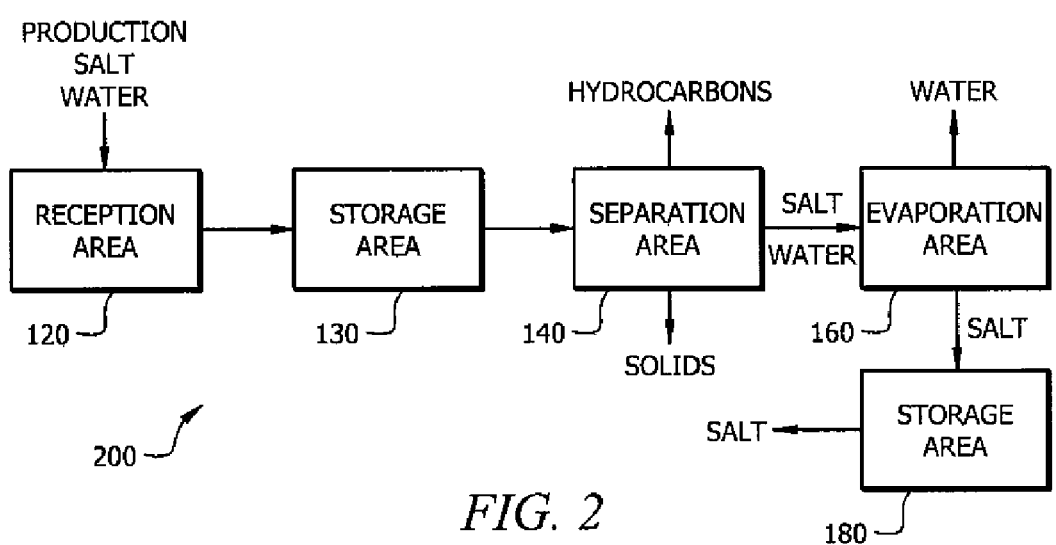
FIG. 2 is a flowchart of an embodiment of a production saltwater separation process.

The salt production station 110 may be any device or apparatus configured to produce salt from production saltwater. For example, the salt production station 110 may implement a production saltwater separation process, such as the production saltwater separation process 200 illustrated in FIG. 2. In the production saltwater separation process 200, a batch or continuous stream of production saltwater may be received in a reception area 120, stored in a production saltwater storage area 130, and any hydrocarbons and/or solids may be separated from the saltwater in a separation area 140. The production saltwater separation process 200 may also separate the water from the salt in an evaporation area 160 and store the salt in a salt storage area 180. In an embodiment, the hydrocarbons, solids, and salt may be suitably disposed or preferably sold, while the water may be evaporated into the atmosphere.

The production saltwater may comprise water and at least one salt. As used herein, a salt may be any compound that comprises, consists essentially of, or consists of an ionic bond, such as the bond formed between an anion and a cation. The salts may include alkaline metals, alkaline earth metals, halides, transition metals, poor metals, non-metals, oxides, hydroxides, or combinations thereof. The salts with greater solubility in water may be included in the salt produced by the salt production station 110, while the salts with less solubility in water may be removed from the water in the separation area 140 along with any non-salt solids.

The saltwater may comprise a substantial amount of salts. For example, the saltwater may comprise at least about 5 grams per liter (g/L), from about 10 to about 100 g/L or about 34 g/L dissolved salts. In an embodiment, the saltwater may comprise an alkaline metal, such as at least about 5,000 parts per million (ppm), from about 10,000 ppm to about 20,000 ppm, or about 15,000 ppm dissolved sodium. As such, the saltwater may have a sodium adsorption ratio (SAR) of at least about 50, from about 100 to about 400, or about 240. Additionally or alternatively, the saltwater may comprise an alkaline earth metal, such as at least about 25 ppm, from about 50 ppm to about 150 ppm, or about 74 ppm magnesium, at least about 50 ppm, from about 100 to about 300 ppm, or about 180 ppm calcium, and/or at least about 5 milligrams per liter (mg/L), from about 10 to about 100 mg/L, and/or about 52 mg/L barium. Additionally or alternatively, the saltwater may comprise at least 5 g/L, from about 10 g/L to about 100 g/L, or about 23 g/L of chloride. Additionally or alternatively, the saltwater may comprise a transition metal, such as at least about 0.1 micrograms per liter (µg/L), from about 0.5 to about 10 µg/L, or about 2 µg/L cadmium and/or at least about 0.1 µg/L, from about 0.5 to about 10 µg/L, or about 2 µg/L chromium. The saltwater may also comprise less than about 20 µg/L, less than about 10 µg/L, or less than about 5 µg/L silver and/or less than about 10 µg/L, less than about 5 µg/L, or less than about 0.8 µg/L mercury. Additionally or alternatively, the saltwater may comprise a poor metal, such as at least about 0.5 µg/L, from about 1 to about 20 µg/L, or about 8 µg/L lead. Additionally or alternatively, the saltwater may comprise a non-metal, such as at least about 10 ppm, from about 25 to about 100 ppm, or about 54 ppm sulfate, less than about 10 µg/L, less than about 5 µg/L, or less than about 1 µg/L arsenic, and/or less than about 100 µg/L, less than about 50 µg/L, or less than about 20 µg/L selenium.

The production saltwater may also comprise various organic compounds. For example, the saltwater may comprise less than about 20 mg/L, less than about 10 mg/L, or less than about 5 mg/L of $C_6$-$C_{12}$ hydrocarbons, and less than about 20 mg/L, less than about 10 mg/L, or less than about 5 mg/L $C_{12+}$ hydrocarbons. The saltwater may also comprise benzene, toluene, ethylbenzene, xylene, or combinations thereof. For example, the saltwater may comprise at least about 0.02 mg/L, from about 0.04 to about 0.2 mg/L, or about 0.08 mg/L benzene and related compounds, at least about 0.02 mg/L, from about 0.04 to about 0.2 mg/L, or about 0.06 mg/L toluene and related compounds. In addition, at least about 0.001 mg/L, from about 0.005 to about 0.1 mg/L, or about 0.01 mg/L xylene and related compounds, and at least about 0.001 mg/L, from about 0.002 to about 0.05 mg/l, or less than about 0.005 mg/L ethylbenzene and related compounds. In a specific embodiment, the saltwater may comprise at least about 0.01 µg/L, from about 0.1 µg/L to about 5 µg/L, or about 0.6 µg/L of naphthalene, at least about 0.01 µg/L, from about 0.1 µg/L to about 5 µg/L, or about 0.3 µg/L 1-methylnaphthalene, at least about 0.01 µg/L, from about 0.1 µg/L to about 5 µg/L, or about 0.4 µg/L 2-methylnaphthalene, at least about 0.01 µg/L, from about 0.1 µg/L to about 1 µg/L, or about 0.2 µg/L penanthrene, at least about 0.01 µg/L, from about 0.1 µg/L to about 1 µg/L, or about 0.2 µg/L pyrene, and less than about 5 µg/L, less than about 1 µg/L, or less than about 0.2 µg/L each of acenaphthylene, acenaphthene, dibenzofuran, fluorene, anthracene, fluoranthene, benzo(a)anthracene, chrysene, benzo(b)fluoranthene, benzo(k)fluoranthene, benzo(a)pyrene, indeno(1,2,3-cd)pyrene, dibenzo(a,h)anthracene, benzo(g,h,i)perylene, or combinations thereof.

The hydrocarbons, solids, and salt produced by the production saltwater separation process 200 may each comprise substantially pure products. For example, the hydrocarbons produced by the production saltwater separation process 200 may comprise at least 80 weight percent, at least 95 weight percent, or at least 99 weight percent organic compounds, such as hydrocarbons. Similarly, the solids produced by the production saltwater separation process 200 may comprise at least 80 weight percent, at least 95 weight percent, or at least 99 weight percent non-dissolvable solids. Finally, the salt produced by the production saltwater separation process 200 may comprise at least 80 weight percent, at least 95 weight percent, or at least 99 weight percent salts, such as alkali metals, alkaline earth metals, and halides.

The hydrocarbons, solids, and salt produced by the production saltwater separation process 200 may also each comprise substantial amounts of their respective components from the production saltwater received in the reception area 120. For example, the hydrocarbons produced by the production saltwater separation process 200 may comprise at least 80 weight percent, at least 95 weight percent, or at least 99 weight percent of the organic compounds present in the production saltwater. Similarly, the solids produced by the production saltwater separation process 200 may comprise at least 80 weight percent, at least 95 weight percent, or at least 99 weight percent of the solids present in the production saltwater. Finally, the salt produced by the production saltwater separation process 200 may comprise at least 80 weight percent, at least 95 weight percent, or at least 99 weight percent of the salts present in the production saltwater.

Figure 3:
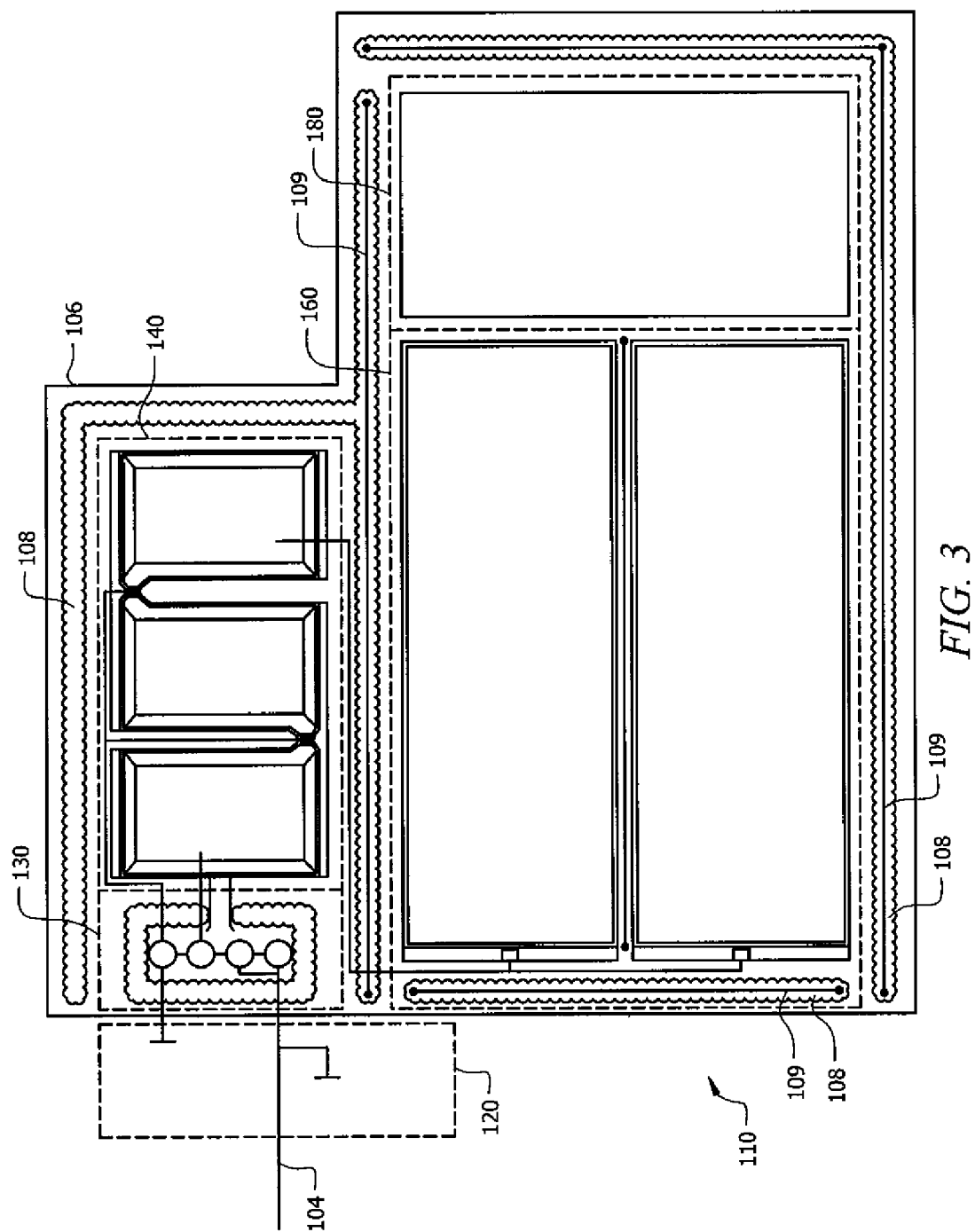
FIG. 3 is a plan view of an embodiment of the salt production station.

FIG. 3 depicts an embodiment of the salt production station 110. As shown in FIG. 3, the salt production station 110 comprises the reception area 120, the production saltwater storage area 130, the separation area 140, the evaporation area 160, and the salt storage area 180. The reception area 120 may receive the production saltwater from the pipeline 104 or other sources, and may pass the production saltwater to the production saltwater storage area 130 for storage. The production saltwater storage area 130 may store the production saltwater, and may subsequently pass the production saltwater to the separation area 140 where the hydrocarbons and solids are removed from the saltwater. The hydrocarbons may be returned to the production saltwater storage area 130, while the solids may accumulate in and may be periodically removed from the separation area 140. The saltwater may then be transferred to the evaporation area 160 where the water may be separated from the salt, for example by evaporation. The salt may then be moved to the salt storage area 180 where it is stored for later transportation and/or sale. The salt production station 110 may be surrounded as appropriate by security fencing 106, berms 108, and wind-deflecting fencing 109 to provide site security, privacy, fluid containment in case of leaks, and/or wind protection. In addition, the salt production station 110 may comprise piping, valves, pumps, filters, controls, lighting, and safety equipment as is necessary to carry out the processes described herein.

Figure 4:
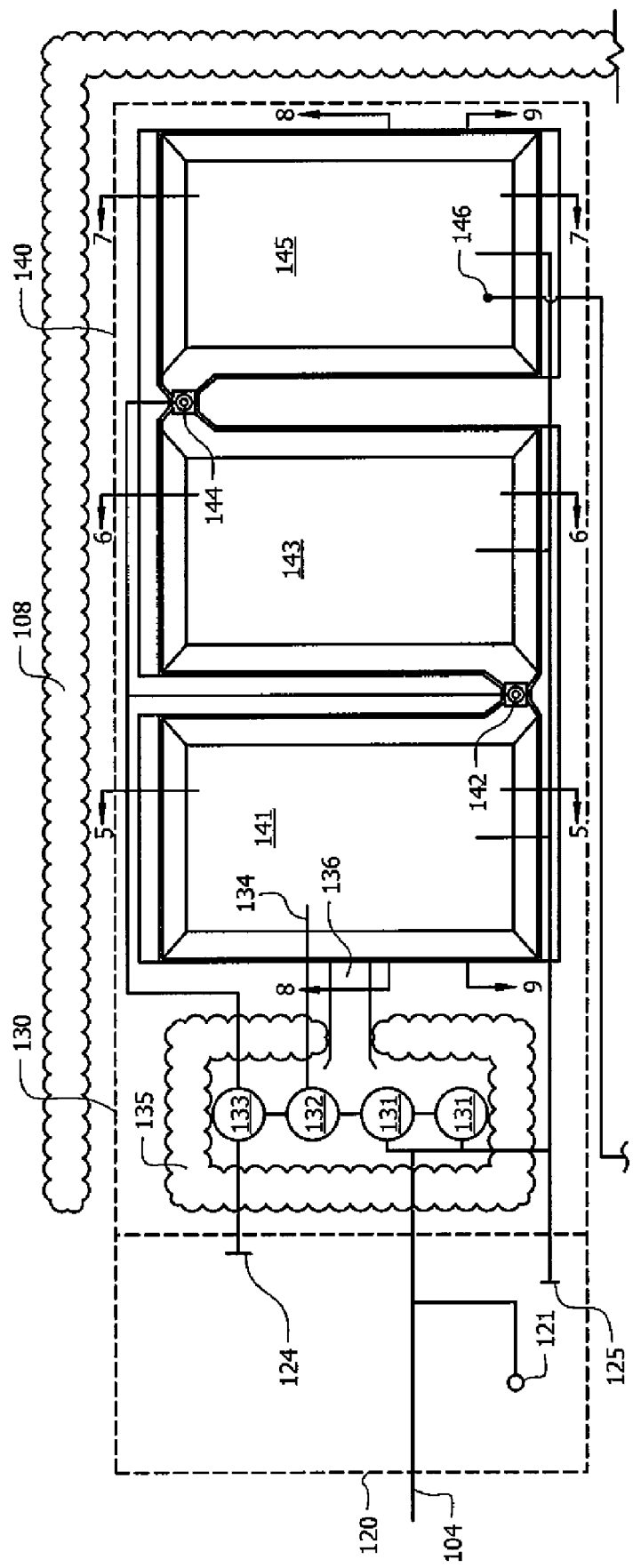
FIG. 4 is a plan view of embodiments of the reception area, the storage area, and the separation area.
Figure 5:
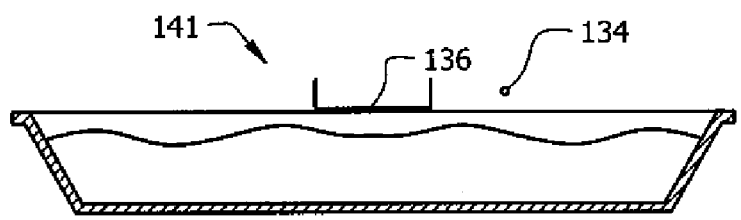
FIG. 5 is a section view of an embodiment of the separation area taken across line 5-5 in FIG. 4.
Figure 6:
FIG. 6 is a section view of an embodiment of the separation area taken across line 6-6 in FIG. 4.
Figure 7:
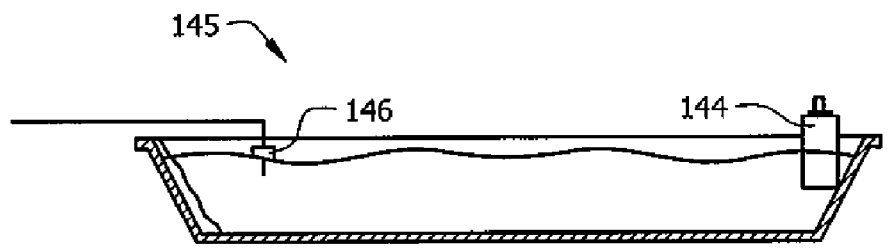
FIG. 7 is a section view of an embodiment of the separation area taken across line 7-7 in FIG. 4.
Figure 8:
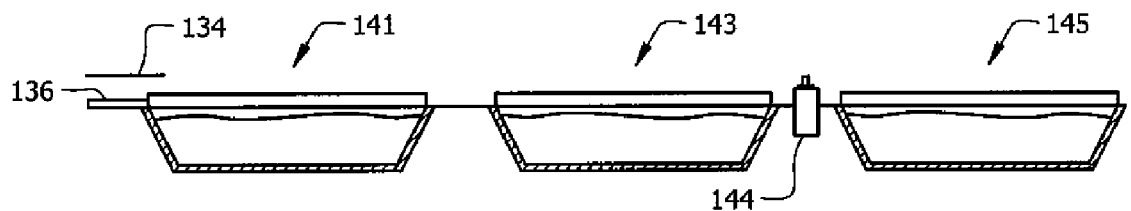
FIG. 8 is a section view of an embodiment of the separation area taken across line 8-8 in FIG. 4.
Figure 9:
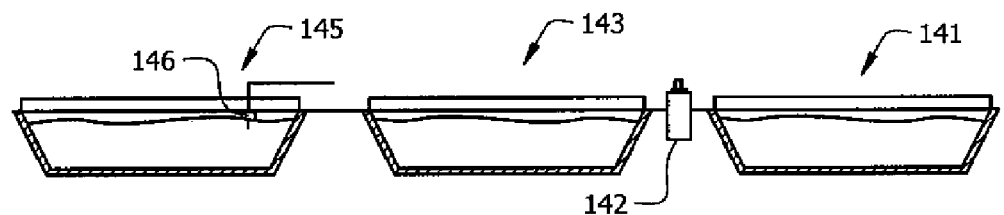
FIG. 9 is a section view of an embodiment of the separation area taken across line 9-9 in FIG. 4.

FIG. 4 depicts a more detailed embodiment of the reception area 120. The reception area 120 may be configured to intake production saltwater from the pipeline 104 or at least one intake connection 121, which may be configured to connect to a vehicle such as a truck, train, ship, or combinations thereof. While the pipeline 104 and the intake connection 121 may pipe the production saltwater directly to the production saltwater storage area 130, more typically the production saltwater may pass through metering equipment configured to measure the volume and amount of production saltwater received by the reception area 120. In addition, the reception area 120 may comprise composition evaluation equipment that can evaluate the composition of the production saltwater, and/or authorization equipment that can determine whether the vehicle is authorized to transfer the production saltwater to salt production station 110. Furthermore, the reception area 120 may be configured to transfer hydrocarbons, saltwater, solids, or combinations thereof from the salt production station 110. For example, the reception area 120 may comprise a hydrocarbon effluent connection 124 that may be configured to transfer the hydrocarbons from the production saltwater storage area 130 to one of the aforementioned vehicles. Alternatively or additionally, the reception area 120 may comprise a vacuum discharge connection 125 that may be configured to transfer the solids and/or saltwater from the separation area 140 and/or the production saltwater storage tanks 131 to one of the aforementioned vehicles. Moreover, the reception area 120 may comprise accounting equipment configured to make or receive payment associated with the transfer of production saltwater, hydrocarbons, and/or solids into or out of the salt production station 110. There may be several components of the reception area 120 that may need to be accessible by persons who do not necessarily need to access the remainder of the salt production station 110. As such, some components of the reception area 120, e.g. connections and authorization equipment, may be on the outside of the security fence 106, while other components of the reception area 120, e.g. sampling equipment, metering equipment, pumps, valves, etc., may be on the inside of the security fence 106.

FIG. 4 also depicts a more detailed embodiment of the production saltwater storage area 130. The production saltwater storage area 130 may comprise a plurality of production saltwater storage tanks 131 that may receive production saltwater from the reception area 120 and store the production saltwater until it is transferred to the separation area 140. The production saltwater storage tanks 131 may be configured such that either or both production saltwater storage tanks 131 may be used to store the production saltwater. Such a configuration allows one of the production saltwater tanks 131 to be down for maintenance while the other is operating. The production saltwater storage tanks 131 also may allow the salt production station 110 to operate at a discontinuous or substantially continuous rate, e.g. independent of the intake rate of production saltwater at the reception area 120. In other words, the production saltwater storage area 130 may allow the salt production station 110 to operate only when economically favorable conditions exist.

When the production saltwater leaves the production saltwater storage tanks 131, it may pass through a gun barrel separator 132. The gun barrel separator 132 may allow the production saltwater to remain relatively still, thereby allowing some of the hydrocarbons to form an organic phase that is predominately hydrocarbons and salts having an affinity for the organic phase on top of the aqueous phase that is predominantly water and salts having an affinity for the aqueous phase. The gun barrel separator 132 may also comprise monitoring equipment that maintains the organic-aqueous phase boundary at a substantially constant level or within a predetermined range, and a siphon or a weir skimmer or pipe to remove the organic phase. The organic phase may be transferred to a hydrocarbon storage tank 133, while the aqueous phase saltwater may be removed from a point below the organic-aqueous phase boundary and away from the inlet, and may be transferred to the separation area 140. The hydrocarbon storage tank 133 may also receive hydrocarbons from the separation area 140 and may store the hydrocarbons until they are ready to be transferred to a vehicle via the hydrocarbon effluent connection 124.

The production saltwater storage tanks 131, gun barrel separator 132, and hydrocarbon storage tank 133 may be constructed of materials and sized appropriate for the composition and amount of production saltwater flowing through the salt production station 110. For example, the production saltwater storage tanks 131, gun barrel separator 132, and hydrocarbon storage tank 133 may be made of fiberglass, steel, or any other suitable material and may have a volume of at least about 100 barrels, from about 200 barrels to about 1,000 barrels, or about 500 barrels. In addition, the production saltwater storage tanks 131, gun barrel separator 132, and hydrocarbon storage tank 133 may be surrounded by a berm 135 and a trough 136 that are lined with a liner, such as a polymer liner about 0.06 inches thick, and downwardly graded towards the separation area 140. As such, any rupture or leakage from the production saltwater storage tanks 131, gun barrel separator 132, and/or hydrocarbon storage tank 133 may be routed into the separation area 140.

FIGS. 4-9 depict a more detailed embodiment of the separation area 140. The separation area 140 may comprise a first settling pit 141, a second settling pit 143, and a third settling pit 145 (collectively, the settling pits). The saltwater generally flows from the first settling pit 141 to the second settling pit 143 to the third settling pit 145, and as it does so solids and hydrocarbons are removed from the saltwater. Specifically, the first settling pit 141 may receive the saltwater from the gun barrel separator 132 via a discharge pipe 134. The trough 136 may also be configured to discharge into the first settling pit 141. Solids settle to the bottom of the first settling pit 141, and if desired, various compounds can be added to first settling pit 141 to promote the settling and/or precipitation of the solids, e.g. by reacting with the solids, changing the temperature of the saltwater, changing the pH of the saltwater, or combinations thereof. The saltwater and any hydrocarbons subsequently pass through a first weir skimmer 142 positioned between the first settling pit 141 and the second settling pit 143. The first weir skimmer 142 skims any hydrocarbons off the saltwater, while the saltwater passes through to the second settling pit 143. Piping connected to the first weir skimmer 142 transports any collected hydrocarbons back to the hydrocarbon storage tank 133. Similarly, solids settle to the bottom of the second settling pit 143, and the saltwater and any remaining hydrocarbons pass through a second weir skimmer 144 positioned between the second settling pit 143 and the third settling pit 145. The second weir skimmer 144 skims any hydrocarbons off the saltwater, while the saltwater passes through to the third settling pit 145. Piping connected to the second weir skimmer 144 transports the hydrocarbons back to the hydrocarbon storage tank 133. In a specific embodiment, the first weir skimmer 142 and the second weir skimmer 144 are both stainless steel DRAGONFLY MICRO OIL SKIMMERS. Like the first settling pit 141 and the second settling pit 143, solids settle out of the saltwater in the third settling pit 145, and the saltwater, which is substantially free of solids and hydrocarbons, is removed from the third settling pit 145 via a discharge pipe 146. The discharge pipe 146 may be a flexible pipe configured to remove saltwater from the top of the third settling pit 145, e.g. such that it does not suck up substantially any solids.

The settling pits may be sized as appropriate for the flow of production saltwater through the salt production station 110. For example, each of the settling pits may have a volume of at least about 5,000 barrels, from about 10,000 barrels to about 100,000 barrels, or about 25,000 barrels. In addition, one or more of the settling pits may be sloped to promote migration of the solids towards a certain direction, and the slope of each settling pit may be the same or different. For example, the settling pits may have a slope of from about 0.1 percent to about 60 percent, from about 0.5 percent to about 10 percent, or about 1 percent. The slope direction may be to one side of the settling pits, e.g. up, down, left, or right in FIG. 4, may be towards the center of the settling pit, may be towards the perimeter of the settling pit, or combinations thereof. In a specific embodiment, the settling pits have a 1 percent slope in the downward direction in FIG. 4, and have a 1 percent slope from the left and right sides in FIG. 4 towards the center of the settling pits. In an embodiment, the settling pits may comprise a primary liner such as a polymer liner having a thickness of at least about 0.01 inches, from about 0.02 inches to about 0.1 inches, or about 0.06 inches. In addition, the settling pits may comprise and a leakage detection system. For example, a secondary liner, such as a polymer liner having a thickness of at least about 0.005 inches, from about 0.01 inches to about 0.1 inches, or about 0.02 inches, may be laid under the primary liner, and a drainage material, e.g. gravel or synthetic material, may be positioned therebetween. In addition, a leakage detection pipe may extend from the surface into the drainage material so that an operator may visually inspect the drainage material to determine whether the primary liner is leaking. Alternatively, an automatic leakage detection system may be positioned within the leakage detection pipe. The settling pits may also be covered with netting to prevent operators or wildlife from falling into the settling pits.

Figure 10:
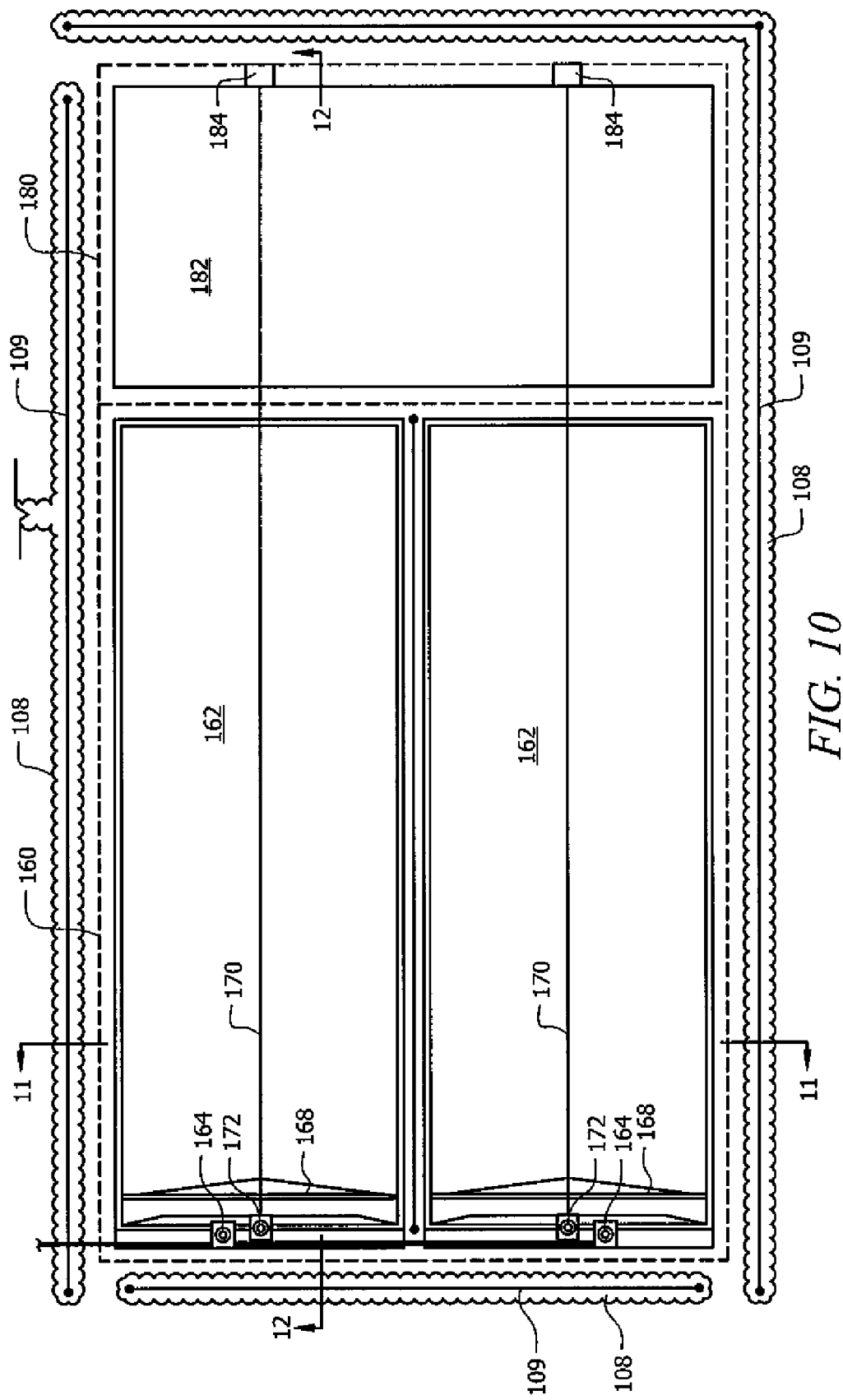
FIG. 10 is a plan view of embodiments of the evaporation area and the storage area.
Figure 11:
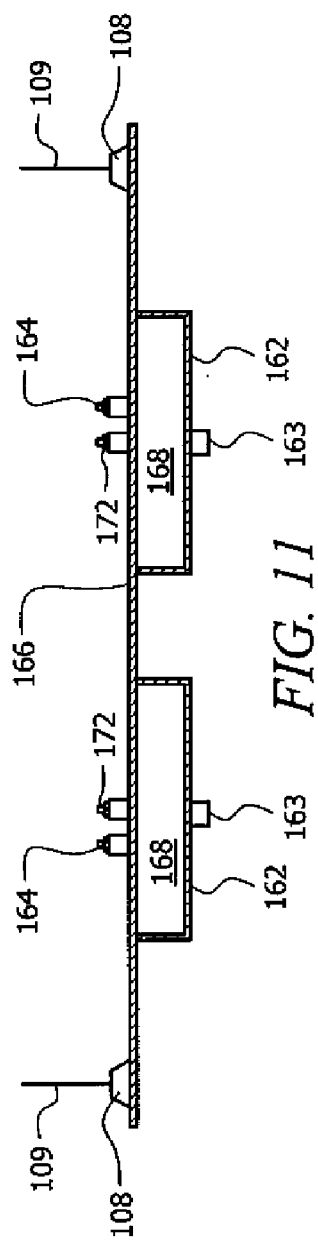
FIG. 11 is a section view of an embodiment of the evaporation area taken across line 11-11 in FIG. 10.
Figure 12:
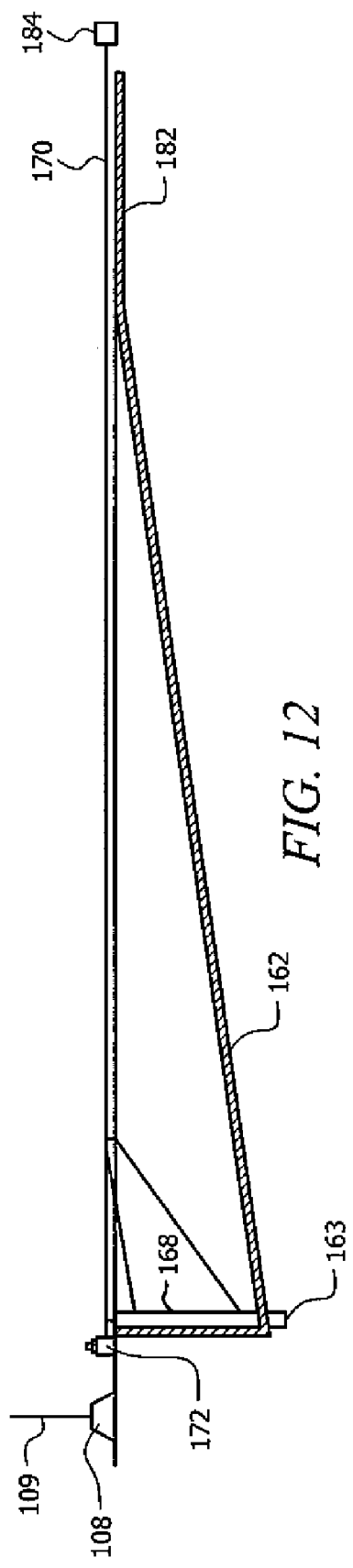
FIG. 12 is a section view of an embodiment of the evaporation area taken across line 12-12 in FIG. 10.

FIGS. 10-12 depict a more detailed embodiment of the evaporation area 160. The evaporation area 160 may comprise a plurality of substantially identical evaporation stations. The evaporation stations may be configured such that either or both evaporation station may be used to evaporate the saltwater. Such a configuration allows one of the evaporation stations to be down for maintenance while the other is operating. Each evaporation station may comprise an evaporator 164 and a collection pit 162. The evaporator 164 may be any device configured to separate the water from the salt in the saltwater. For example, the evaporator 164 may be a TURBO-MIST evaporator manufactured by SLIMLINE manufacturing. The evaporator 164 may comprise an upward-directed nozzle that is configured to spray the saltwater received from the separation area 140 into the air. The nozzle may be configured to produce at least one fine stream that allows at least some of the water to evaporate while in the air, which leaves the salt to fall into the collection pit 162. For example, the evaporator 164 may be configured to spray at least about 10 barrels per hour, from about 20 barrels per hour to about 500 barrels per hour, or about 50 barrels per hour of saltwater. As such, the salt production station 110 may produce at least 1,000 pounds per day, from about 2 tons per day to about 50 tons per day, or about 10 tons per day of salt. In an embodiment, the horizontal and/or vertical orientation of the nozzle may be adjustable and perhaps controlled automatically to account for wind, temperature, relative humidity, and so forth. The collection pit 162 may be oriented such that the prevailing winds blow across or behind the evaporator 164 effluent. The collection pit 162 may be sized to collect substantially all of the salt produced by the evaporation. For example, the collection pit 162 may be from about 50 feet to about 200 feet, from about 70 feet to about 125 feet, about 90 feet wide, from about 50 feet to about 600 feet, from about 150 feet to about 500 feet, about 350 feet long, and from about 1 foot to about 20 feet, from about 2 feet to about 10 feet, about 5 feet deep. The collection pit 162 may also be configured with a drain 163 as well as pumps and piping appropriate to recover any unevaporated water and return such to the evaporators 164, separation area 140, and/or production saltwater storage area 130.

In addition, one or more of the collection pits 162 may be sloped to promote migration of the salt and/or any residual water towards a certain direction, and the slope of each collection pit 162 may be the same or different. For example, the collection pit 162 may have a slope of from about 0.1 percent to about 60 percent, from about 0.5 percent to about 10 percent, or about 1 percent. The slope direction may be to one side of the collection pit 162, e.g. up, down, left, or right in FIG. 10, may be towards the center of the collection pit 162, may be towards the perimeter of the collection pit 162, or combinations thereof. In a specific embodiment, the collection pit 162 may have a 1 percent slope from right to left in FIG. 10, e.g. towards to the evaporator 164, and may have a 1 percent slope from the top and bottom sides in FIG. 10, e.g. towards the center of the collection pit 162. Furthermore, the collection pit 162 may comprise a liner similar to the primary or secondary liner described above. Finally, the evaporation area 160 may be surrounded by the berm 108 and/or wind-deflecting fence 109, e.g. an 8-foot high berm and/or a 15-foot high wind-deflecting fence, to prevent the wind from blowing the water stream and/or salt away from the collection pit 162. The berm 180 and/or fencing 109 may be installed between individual evaporations stations, if desired.

Each evaporation station may comprise a salt conveyor that is configured to move the salt from the collection pit 162 to the salt storage area 180. For example, the evaporation station may comprise a blade 168, a motor 172, and a cable 170. The blade 168 may be a box blade or any other apparatus configured to scrape the salt across the collection pit 162. If desired, the blade 168 may have a horizontal and/or vertical concavity to promote collection and movement of the salt. The blade 168 may be connected to the motor 172 by the cable 170, which may extend from the motor 172 through a pulley 184 in the salt storage area 180 and to the blade 168 from one side of the motor 172, and directly to the blade 168 on the other side of the motor 172. As such, when the motor 172 is actuated in a forward direction, the blade 168 may be pulled across the collection pit 162 in a first direction, e.g. towards the pulley 184, and may move the salt from the collection pit 162 to the salt storage area 180. Similarly, when the motor 172 is actuated in a reverse direction, the blade 168 may be pulled across the collection pit 162 in a second direction, e.g. towards the motor 172, and may return to its initial location proximate to the evaporators 164. If desired, the blade 168 may also be fitted with a vertical actuation mechanism the raises and lowers the blade 168. The blade 168 may be actuated as needed to prevent excessive build-up of salt in the collection pit 162. Also, the blade 168 may be actuated when the evaporators 164 are not in operation, e.g. to limit the amount of salt build-up behind the blade 168. Additionally or alternatively, the evaporation station may use backhoes, bulldozers, front-end loaders, or other mobile equipment to move the salt from the collection pit 162 to the salt storage area 180.

FIGS. 10 and 12 also depict a more detailed embodiment of the salt storage area 180. The salt storage area 180 may comprise a salt storage pad 182 and the pulley 184. The salt storage pad 182 may be used as a storage and/or additional drying area for the salt until the salt can be loaded into a storage container or vehicle. If desired, a roof or tarp may be used to cover the salt, e.g. to prevent rain from wetting or wind from blowing away the salt. Additionally or alternatively, the salt storage pad 182 may be surrounded by the aforementioned berm 108 and/or fencing 109. The salt may meet or exceed various federal and/or state regulations for agricultural and livestock use, and as such the salt may be suitable for agricultural use and/or animal consumption.

The efficiency with which the salt production station 110 produces the salt may be dependent on the environmental conditions at the salt production station. In an embodiment, the salt production station 110 may be operated when the ambient temperature is at least about 50° F., at least about 70° F., or at least about 90° F. In addition, the salt production station 110 may be operated when the relative humidity is no more than about 60 percent, no more than about 30 percent, or no more than about 10 percent. Such conditions, along with the wind, may cause at least about 40 weight percent, at least about 60 weight percent, or at least about 90 weight percent of the water in the saltwater to evaporate.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A process comprising:
   receiving production saltwater comprising water, salt, and hydrocarbons;
   separating substantially all of the hydrocarbons from the production saltwater, thereby producing a stream consisting essentially of the water and the salt and optionally solids;
   evaporating at least some of the water in the stream to obtain the salt; and
   collecting the salt.

2. The process of claim 1, wherein receiving the production saltwater comprises withdrawing the production saltwater from a production saltwater pipeline coupled to a hydrocarbon well, wherein the hydrocarbon well is directly connected to a subterranean formation, wherein the hydrocarbon well separates hydrocarbons from the production saltwater, and wherein the received production saltwater is substantially the same as the production saltwater separated by the hydrocarbon well.

3. The process of claim 1, wherein receiving the production saltwater comprises receiving the production saltwater from a vehicle that received the production saltwater from a hydrocarbon well, wherein the hydrocarbon well is directly connected to a subterranean formation, wherein the hydrocarbon well separates hydrocarbons from the production saltwater, and wherein the received production saltwater is substantially the same as the production saltwater separated by the hydrocarbon well.

4. The process of claim 1, wherein evaporating at least some of the water comprises spraying the stream into the open atmosphere, wherein substantially all of the salt in the sprayed stream falls onto the ground, and wherein at least about 50 weight percent of the water in the sprayed stream evaporates in the open atmosphere.

5. The process of claim 1, wherein evaporating at least some of the water comprises spraying the stream into the air, wherein substantially all of the salt in the sprayed stream falls onto the ground, and wherein substantially all of the water in the sprayed stream evaporates into the air.

6. The process of claim 5, wherein separating substantially all the hydrocarbons from the production saltwater comprises passing the production saltwater through a weir skimmer.

7. The process of claim 6, wherein separating substantially all of the hydrocarbons from the production saltwater further comprises passing the production saltwater through a gun barrel separator.

8. A process comprising:
  receiving production saltwater comprising water, salt, and hydrocarbons:
  separating substantially all of the hydrocarbons from the production saltwater, wherein separating substantially all the hydrocarbons from the production saltwater comprises:
    passing the production saltwater through a gun barrel separator; and
    passing the production saltwater through a weir skimmer;
  combining the hydrocarbons from the weir skimmer and the gun barrel separator in a hydrocarbon storage tank;
  evaporating at least some of the water in the production saltwater to obtain the salt; and
  collecting the salt.

9. The process of claim 1, wherein the production saltwater further comprises solids, and wherein the process further comprises separating substantially all the solids from the production saltwater in a settling pit exposed to the atmosphere prior to evaporating at least some of the water.

10. The process of claim 9, wherein the solids comprise a transition metal.

11. The process of claim 1, wherein the received production saltwater consists essentially of the water, the salt, the hydrocarbons, and optionally solids, and wherein collecting the salt comprises scraping the salt from a collection pit onto a salt storage area.

12. The process of claim 1, wherein the production saltwater has a sodium absorption ratio greater than or equal to about 100.

13. The process of claim 1, wherein the hydrocarbons comprises benzene, toluene, ethylbenzene, xylene, or combinations thereof.

14. The process of claim 7 further comprising combining the hydrocarbons from the weir skimmer and the gun barrel separator in a hydrocarbon storage tank.

15. A production saltwater disposal process occurring in a production saltwater disposal facility, the process comprising:
  receiving, at the production saltwater disposal facility, production saltwater produced by a hydrocarbon well directly connected to a subterranean formation, wherein the production saltwater received by the production saltwater facility is substantially the same as the production saltwater produced by the hydrocarbon well, and wherein the production saltwater comprises water, salt, and hydrocarbons;
  separating substantially all of the hydrocarbons from the production saltwater, thereby producing a stream consisting essentially of the water and the salt and optionally solids; and
  evaporating at least some of the water in the stream to obtain the salt.

16. The process of claim 15, wherein the production saltwater comprises solids, and wherein the process further comprises settling the solids out of the production saltwater using a settling pit exposed to the atmosphere.

17. The process of claim 16, wherein separating substantially all the hydrocarbons from the production saltwater comprises:
  passing the production saltwater through a first separator to produce a first group of hydrocarbon compounds consisting of hydrogen and carbon;
  passing the production saltwater through a second separator to produce a second group of hydrocarbon compounds consisting of hydrogen and carbon; and
  placing the first group of hydrocarbon compounds and the second group of hydrocarbon compounds in a hydrocarbon storage tank.

18. The process of claim 17, wherein receiving the production saltwater comprises receiving the production saltwater from a vehicle, and wherein the process further comprises gathering the salt from the ground and storing the salt in a salt storage area.

19. The process of claim 18, wherein evaporating at least some of the water comprises spraying the stream into the open atmosphere, wherein substantially all of the salt in the sprayed stream falls onto the ground, and wherein at least about 50 weight percent of the water in the stream evaporates in the open atmosphere.

20. The process of claim 16, wherein separating substantially all the hydrocarbons from the production saltwater comprises:
  passing the production saltwater through a first separator to produce a first group of hydrocarbon compounds comprising hydrogen and carbon;
  passing the production saltwater through a second separator to produce a second group of hydrocarbon compounds comprising hydrogen and carbon; and
  placing the first group of hydrocarbon compounds and the second group of hydrocarbon compounds in a hydrocarbon storage tank.

* * * * *